United States Patent Office 3,752,810
Patented Aug. 14, 1973

3,752,810
SUBSTITUTED N-AMINOALKYL-ARYLAMINO-IMIDAZOLINES-(2)
Helmut Stähle, Herbert Köppe, Werner Kummer, and Hans-Wolfgang Samtleben, Ingelheim am Rhein, Germany, assignors to Boehringer Ingelheim G.m.b.H., Ingelheim am Rhein, Germany
No Drawing. Filed Nov. 16, 1970, Ser. No. 90,036
Claims priority, application Germany, Nov. 17, 1969, P 19 57 722.1
Int. Cl. C07d 87/38, 87/40
U.S. Cl. 260—247.5 R          10 Claims

ABSTRACT OF THE DISCLOSURE

Novel compounds selected from the group consisting of N-aminoalkyl-arylamino-imidazolines-(2) of the formula

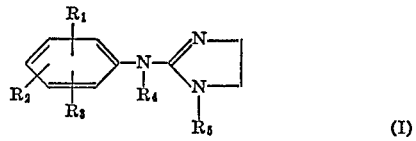

wherein $R_1$, $R_2$ and $R_3$ may be the same or different and are selected from the group consisting of hydrogen, fluorine, chlorine, bromine, trifluoromethyl, cyano and lower alkyl and lower alkoxy of 1 to 7 carbon atoms and one of $R_4$ and $R_5$ being hydrogen with the other being $-(CH_2)_n-A$, $n$ is 2 or 3 and A is selected from the group consisting of dialkylamino with 1 to 4 carbon atoms in each alkyl, morpholino, pyrrolidino and piperidino and their non-toxic, pharmaceutically acceptable acid addition salts having hypotensive activity, their preparation and their use.

OBJECTS OF THE INVENTION

It is an object of the invention to provide the novel N-aminoalkyl-arylamino-imidazolines-(2) of Formula I and their acid addition salts.

It is another object of the invention to provide novel processes for the preparation of the compounds of Formula I.

It is a further object of the invention to provide novel hypotensive compositions.

It is an additional object of the invention to provide a novel method of reducing blood pressure in warm-blooded animals.

These and other objects and advantages of the invention will become obvious from the following detailed discussion.

THE INVENTION

The novel compounds of the invention are selected from the group consisting of N-aminoalkyl-arylamino-imidazolines-(2) of the formula

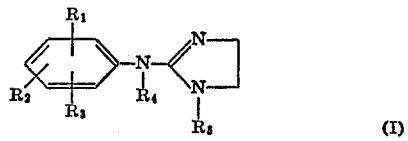

wherein $R_1$, $R_2$ and $R_3$ may be the same or different and are selected from the group consisting of hydrogen, fluorine, chlorine, bromine, trifluoromethyl, cyano and lower alkyl and lower alkoxy of 1 to 7 carbon atoms and one of $R_4$ and $R_5$ being hydrogen with the other being $-(CH_2)_n-A$, $n$ is 2 or 3 and A is selected from the group consisting of dialkylamino with 1 to 4 carbon atoms in each alkyl, morpholino, pyrrolidino, and piperidino and their non-toxic, pharmaceutically acceptable acid addition salts.

Examples of suitable non-toxic, pharmaceutically acceptable acids for the formation of the acid addition salts of the imidazolines-(2) of Formula I are mineral acids such as hydrochloric acid, hydrobromic acid, hydriodic acid, hydrofluoric acid, sulfuric acid, phosphoric acid and nitric acid, organic acids such as acetic acid, propionic acid, butyric acid, valeric acid, caproic acid, oxalic acid, malonic acid, succinic acid, maleic acid, fumaric acid, lactic acid, tartaric acid, citric acid, malic acid, benzoic acid, salicyclic acid, phthalic acid, cinnamic acid, ascorbic acid, 8-chlorotheophylline and the like.

A preferred group of the compounds of Formula I are imidazolines-(2) having the formula

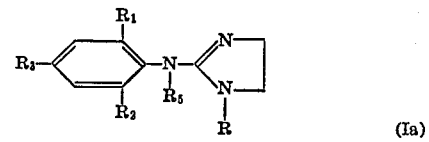

wherein $R_1$, $R_2$ and $R_3$ are halogen atoms, preferably bromine or chlorine or methyl groups and $R_4$ and $R_5$ have the above meanings. Compounds of the formula

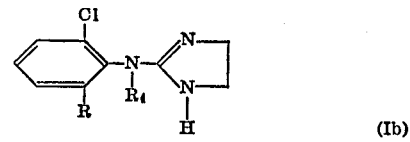

wherein $R_4$ has the above meaning, and R is a chlorine atom or a methyl group are especially preferred.

The novel compounds of Formula I can be produced by at least four processes:

(a) Alkylation of a substituted 2-arylamino-imidazoline-(2) of the formula

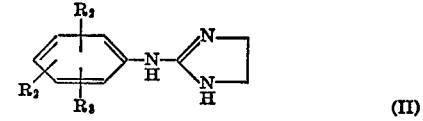

wherein $R_1$, $R_2$ and $R_3$ have the above-mentioned meaning, with an aminoalkylhalide of the formula $$Hal-(CH_2)_n-A$$

wherein Hal is chlorine, bromine or iodine and A and $n$ have the above meanings;

(b) Reaction of a compound of the formula

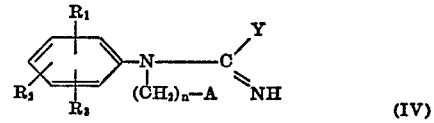

wherein $R_1$, $R_2$, $R_3$ as well as A and $n$ have the above mentioned meanings and Y is an amino, sulfhydryl, alkoxy or alkylthio group with up to 3 carbon atoms in the alkyl group or a compound of the formula

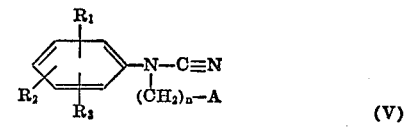

wherein $R_1$, $R_2$, $R_3$ as well as A and $n$ have the meanings indicated above, with ethylenediamine or the acid addition salts thereof, such as the p-toluene-sulfonate;

(c) Reaction of a compound of the formula

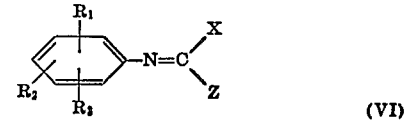

wherein $R_1$, $R_2$ and $R_3$ have the meanings indicated above and X and Z, which may be the same or different from each other, are a halogen, preferably chlorine, an alkoxy or alkylthio group with up to 3 carbon atoms in the alkyl portion, or a sulfhydryl or an amino group, with a triamine of the formula

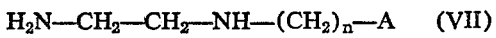

wherein $n$ and A have the meanings indicated above;

(d) Halogenation of compounds of Formula I, wherein at least one of the radicals $R_1$, $R_2$ and $R_3$ represents hydrogen, with chlorine or bromine.

The starting compounds are partly known and those not known may be produced in accordance with known processes. In an alkylation according to process (a), compounds wherein $R_5$ is hydrogen are obtained. The proof may be made with the aid of NMR-spectroscopy: in case of a substitution of the bridging nitrogen atoms, the 4 methylene-protons of the imidazoline ring appear as singlet at approx. 6.5 p.p.m. ($\tau$-scale), whereas in case of a substitution at the imidazoline ring-nitrogen, the 4 methylene protons split into a complex multiplet at approx. 6 to 7 p.p.m. ($\tau$-scale). In case of processes (b) and (c), the structure of the resulting compounds of Formula I is fixed by the synthesis anyway.

For the production of the preferred group of compounds of Formula Ia, there are used in case of a reaction in line with process (a), compounds of the formula

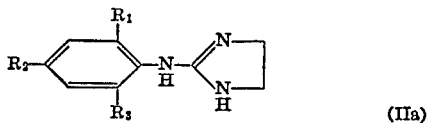

in case of a reaction by process (b), compounds of the formula

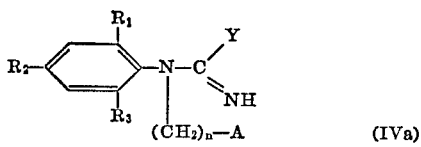

or

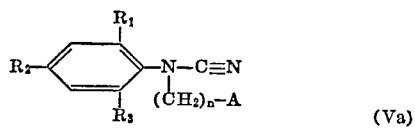

and in case of a reaction by process (c), compounds of the formula

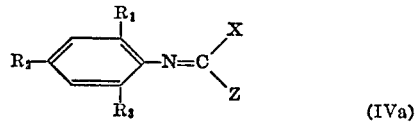

In Formulas IIa, IVa, Va and VIa the radicals $R_1$, $R_2$, $R_3$ as well as A and $n$ and X, Y and Z have the meaning indicated above.

To produce the especially preferred compounds of general Formula Ib, in case of the alkylation with process (a), 2-(2,6-dichlorophenyl-amino)-or 2 - (2 - chloro-6-methylphenyl-amino)-imidazoline-(2) are the starting materials. In case of the reaction of process (b), compounds of general formula

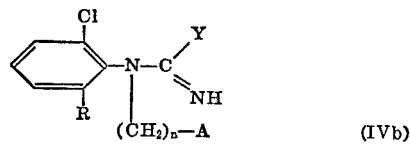

or compounds of general formula

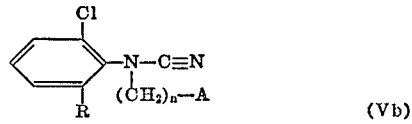

are the starting materials and in case of the reaction of process (c), compounds of general formula

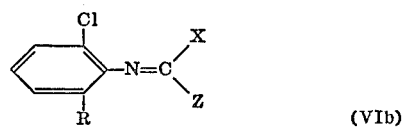

are the starting materials. In Formulas IVb, Vb and VIb the radical A, $n$ as well as R, X, Y, and Z have the meanings indicated above.

In each case, the reaction conditions depend essentially upon the reactivity of the specific starting compound and may deviate within broad limits. It is most useful to reach the starting compounds in the presence of an organic solvent and the temperature ranges from 0° C. to the reflux temperature of the reaction mixture. The N-aminoalkyl-arylamino-imidazolines-(2) of general Formula I of the invention may be converted into the pharmaceutically acceptable acid addition salts thereof in the usual way.

The novel hypotensive compositions of the invention are comprised of an effective amount of a compound of Formula I or its non-toxic, pharmaceutically acceptable acid addition salts and a pharmaceutical carrier. The compositions may be in the form of tablets, capsules, suppositories, solutions, suspensions, drops, and powders prepared in the usual fashion. The powders may contain conventional galenic excipients, carriers, disintegrants, lubricants or sustained release substances. The oral dose may be 0.5 to 100 mg., preferably 3 to 30 mg., of active ingredient.

The compositions because of their hypotensive activity are useful for the treatment of hypertonia and glaucoma. Many of the compounds of Formula I also possess analgesic and vasoconstrictive activity and are therefore useful for the treatment of migraine. The compounds of Formula I frequently also possess sedative, secretion-inhibitory and strong diuretic activities. The compositions may further contain other therapeutically active compounds such as antihypertonics, spasmolytics, saluretics, diuretics, analgesics, etc.

The novel method of the invention of reducing blood pressure in warm-blooded animals comprises administering to animals a safe and effective amount of a compound of Formula I or its non-toxic, pharmaceutically acceptable acid addition salts. The active compounds may be administered orally, parenterally or enterally. An effective dose in the adult is 0.0084 to 1.66 mg./kg., preferably 0.05 to 0.5 mg./kg.

In the following examples there are described several preferred embodiments to illustrate the invention. However, it should be understood that the invention is not intended to be limited to the specific embodiments.

EXAMPLE 1

2-[N-(2-chloro-p-tolyl)-N-($\beta$-morpholinoethyl)-amino]-imidazoline-(2)

10.4 g. (0.05 mol) of 2-(2-chloro-p-tolyl-amino)-imidazoline-(2) and 10.2 g. (110%) of $\beta$-morpholino-ethylchloride hydrochloride and 5.3 g. sodium carbonate in 50 cc. of glycol monomethylether were refluxed for 5 hours, while stirring. Then, the reaction mixture was evaporated to dryness in vacuo and the residue was dissolved in dilute hydrochloric acid. To purify it, the hydrochloric acid solution was extracted with ether after treatment with active charcoal and the ether extracts were abandoned. The oily imidazoline base liberated with 5 N sodium hydroxide solution was salted out with sodium chloride and was taken up in ether. The ether phase was dried over drierite and the ether was evaporated off in vacuo to obtain 7.0 gm. (43.5% yield) of 2-[N-(2-chloro-p-tolyl-N-(β-morpholinoethyl)-amino]-imidazoline as reddish yellow oil, which crystallized after some time. The product melted at 62–64° C.

EXAMPLE 2

2-[N-(2,6-dichlorophenyl)-N-(β-pyrrolidinoethyl)-amino]-imidazoline-(2)

A mixture of 9.2 g. (0.04 mol) of (2,6-dichlorophenylamino)-2-imidazoline-(2), 7.1 g. (105%) of N-(2-chloroethyl)-pyrrolidine hydrochloride and 6.3 g. of sodium carbonate in 50 cc. of absolute ethanol was refluxed for 6 hours while stirring. Then, the solvent was distilled off in vacuo and the residue was dissolved in dilute hydrochloric acid. To separate the unreacted starting imidazoline, the acid solution was extracted with ether at various pH-values (fractionated alkalization with 2 N NaOH) in fractions, while using sodium chloride also. Those ether extracts containing the novel substance in its pure form (proof by thin-layer chromatography, system:benzene: dioxan:ethanol:conc. $NH_3$=50:40:5:5, proof: Schlittler's reagent) were united, dried over drierite and evaporated to dryness in vacuo to obtain 4.1 gm. (31.3% yield) of 2 - [N-(2,6-dichlorophenyl)-N-(β-pyrrolidinoethyl)-amino]-imidazoline derivative crystallized after some time. The product melted at 100–102° C.

EXAMPLE 3

2-[N-(4-bromo-2,6-dichlorophenyl)-N-(β-morpholinoethyl)-amino]-imidazoline-(2)

A mixture of 8.1 g. (0.026 mol) of 2-(4-bromo-2,6-dichlorophenylamino)-imidazoline-(2), 5.15 g. (105%) of N-(2-chloroethyl)-morpholine hydrochloride and 5.6 g. of sodium carbonate in 50 cc. of absolute ethanol was refluxed for 6 hours.

After evaporation in vacuo to dryness, the solid residue was taken up in dilute hydrochloric acid, and the mixture was vacuum filtered and the filtrate was purified with active charcoal.

By fractionated extraction of ether at various pH-values (buffering with NaOH), the compound was obtained in its pure form which after removal of the ether, gave 4.6 g. (41.4% yield) of 2-[N-(4-bromo-2,6-dichlorophenyl)-N-(β-morpholinoethyl)-amino]-imidazoline - (2) melting at 132–133° C.

EXAMPLES 4 TO 45

Using the procedure of Example 1, the arylamino-imidazoline-(2) and aminoalkyl halide were reacted to form the corresponding N-aminoalkyl-arylamino-imidazoline of Formula Ia. The examples together with the percentage of yield and melting point of the products are reported in Table I.

TABLE I

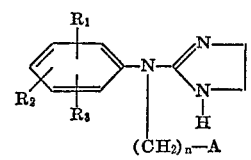

Ia

| Example Number | $R_1$ | $R_2$ | $R_3$ | n—A | Melting point, °C. | Percent yield |
|---|---|---|---|---|---|---|
| 4 | 2-Cl | 6-Cl | H | 2—N⟨O⟩ | 75–80 | |
| 5 | 2-CH₃ | 4-Cl | H | Same as above | 105–107 | 37.2 |
| 6 | 4-CN | H | H | do | 123–124 | 73.5 |
| 7 | 2-Cl | 6-CH₃ | H | do | 91–94 | 73.4 |
| 8 | 2-Cl | 4-CH₃ | H | 2—N⟨H⟩ | Oil | 29.7 |
| 9 | 2-Cl | 6-Cl | H | Same as above | 105–107 | 32.4 |
| 10 | 2-Cl | 6-Cl | H | 3—N⟨H⟩ | 91–93 | 67.6 |
| 11 | 2-CH₃ | 4-Cl | H | 2—N⟨H⟩ | 78–80 | 19.5 |
| 12 | 2-Cl | 6-Cl | H | 3—N(CH₃)₂ | 59–61 | 15.8 |
| 13 | 2-CF₃ | H | H | 2—N⟨O⟩ | 146 | 14.6 |
| 14 | 2-Cl | 6-Cl | H | 2—N⟨H⟩ | 100–102 | 31.3 |
| 15 | 4-F | H | H | 2—N⟨O⟩ | 94–96 | 26.2 |
| 16 | 4-Br | H | H | Same as above | 84–86 | 60.8 |
| 17 | 2-Cl | 6-Cl | H | 2—N(CH₃)₂ | 71–73 | 25.7 |
| 18 | 4-CH₃ | H | H | 2—N⟨O⟩ | Oil | 33.9 |
| 19 | 2-Cl | 5-Cl | H | 2—N⟨H⟩ | 110–112 | 22.9 |
| 20 | H | H | H | 2—N⟨O⟩ | Oil | 58.0 |
| 21 | 2-Cl | 4-Cl | H | 2—N⟨H⟩ | 82 | 7.6 |

TABLE I—Continued

| Example Number | R₁ | R₂ | R₃ | n—A | Melting point, °C. | Percent yield |
|---|---|---|---|---|---|---|
| 22 | 2-Cl | 6-CH₃ | H | Same as above | 88-89 | 5.7 |
| 23 | 2-Cl | 6-CH₃ | H | 2—N(C₃H₇-i)₂ | ¹ 204-206 | 14.1 |
| 24 | 2-Cl | 6-Cl | H | 2—N—(C₃H₇-i)₂ | 48-50 | 45.5 |
| 25 | 2-Br | 4-Br | H |  | 102-103 | 12.0 |
| 26 | 2-Cl | 4-Br | 6-Cl |  | 132-133 | 41.4 |
| 27 | 2-Cl | 4-Br | 6-Cl |  | 117-119 | 34.8 |
| 28 | 2-Cl | 4-Br | 6-Cl | 2—N(C₃H₇-i)₂ | 77-78 | 69.8 |
| 29 | 2-Cl | 3-Cl | H |  | Oil | 26.2 |
| 30 | 2-CH₃ | 4-Cl | 6-Br | Same as above | 131-132 | 41.5 |
| 31 | 2-Cl | 5-Cl | H | ...do... | 66-67 | 40.0 |
| 32 | 2-Cl | 4-CH₃ | H | 2—N(C₃H₇-i)₂ | Oil | 19.3 |
| 33 | 4-Cl | H | H |  | 77-79 | 25.0 |
| 34 | 2-CH₃ | 4-Cl | H |  | ² 198-200 | 12.2 |
| 35 | 2-Cl | 4-CH₃ | H | Same as above | ² 204-206 | 17.1 |
| 36 | 2-Cl | 6-Cl | H | 2—N(C₂H₅)₂ | 56 | 59.2 |
| 37 | 2-Cl | 6-CH₃ | H | 2—N(C₂H₅)₂ | 43 | 37.0 |
| 38 | 2-Cl | 4-CH₃ | H | 2—N(C₂H₅)₂ | ² 207-208 | 18.4 |
| 39 | 2-CH₃ | 4-Cl | H | 2—N(C₂H₅)₂ | ² 194-196 | 24.3 |
| 40 | 2-Cl | 6-Cl | H | 3—N(CH₃)₂ | 127-128 | 37.3 |
| 41 | 2-Cl | 6-CH₃ | H | 2—N(CH₃)₂ | ² 228-230 | 7.6 |
| 42 | 2-CH₃ | 4-Cl | H | 2—N(CH₃)₂ | 78-82 | 5.8 |
| 43 | 2-CH₃ | 6-CH₃ | H |  | ² 212-214 | 11.5 |
| 44 | 2-C₂H₅ | 6-C₂H₅ | H | Same as above | ¹ 206-209 | 61.5 |
| 45 | 2-OCH₃ | 5-Cl | H | ...do... | ¹ 221-223 | 38.8 |

¹ Picrate.   ² Oil (picrate).

EXAMPLE 46

2-[N-(4-bromophenyl)-N-(β-morpholinoethyl)amino]-imidazoline-(2)

Step A: N-(p-bromophenyl)-N-(2-morpholinoethyl)-amine.—A mixture of 51.5 g. (0.3 mol) of p-bromoaniline, 55.8 g. (0.3 mol) of N-(2-chloroethyl)-morpholine hydrochloride and 48 g. of sodium carbonate in 200 cc. of n-butanol was refluxed for 5 hours. Then the reaction mixture was evaporated to dryness in vacuo and the solid residue was treated with dilute hydrochloric acid. After vacuum filtration of the mixture, the base was liberated from the filter residue with dilute sodium hydroxide solution and taken up in ether. The solution was dried over MgSO₄, treated with charcoal and the dihydrochloride was precipitated with ethereal hydrochloric acid. After recrystallization from methanol, 35.5 gm. of N-(p-bromo-phenyl)-N-(2-morpholinoethyl)-amine-dihydrochloride melting at 183-185° C. were obtained.

Step B: N-(p-bromophenyl)-N-(2-morpholinoethyl)-thiourea.—10 g. (0.04 g. mol) of the amine dihydrochloride of step A were added to a mixture of 6 cc. of concentrated hydrochloric acid and 20 cc. of water together with 5.95 g. of ammonium-rhodanide and while stirring the mixture maintained for 6 hours at 95 to 98° C. (water bath). After cooling, 8.8 gm. of N-(p-bromophenyl)-N-(2-morpholinoethyl)-thiourea were obtained in form of a hard mass. The slightly impure thiourea was used in its crude condition.

Step C: N-(p-bromophenyl)-N-(2-morpholinoethyl)-S-methyl-isothiuronium hydroiodide.—8.8 g. of N-(p-bromophenyl)-N-(2-morpholinoethyl)-thiourea (0.025 mol) and the solvent were evaporated off in vacuo to obtain 12.5 g. (quantitative) of N-(p-bromophenyl)-N-(2-morpholino-ethyl)-S-methyl-isothiuronium hydroiodide.

Step D: 2-[N-(4-bromophenyl)-N-(β-morpholinoethyl)-amino]-imidazoline-(2).—10.1 g. (0.04 mol) of the isothiuronium hydroiodide of Step C and 3.9 cc. of ethylenediamine in 30 cc. of n-butanol were refluxed for 2 hours. After standing overnight at room temperature the mixture was evaporated to dryness in vacuo and the oily residue was taken up in dilute hydrochloric acid. To separate unreacted starting material as well as by-products the mixture was extracted in fractions at various pH-values (buffering with dilute sodium hydroxide solution) with ether and chloroform. Among the total of 22 ether fractions obtained, the last two contained 2-[N-(p-bromophenyl)-N-(2 - morpholinoethyl) - amino]-2-imidazoline in a yield of 1.0 g. and melting at 84–86° C.

EXAMPLE 47

1-[2-(N,N-dimethylamino)-ethyl]-2-(4-chloro-o-toluidino)-imidazoline-(2)

17.1 g. (0.05 mol) of N-(4-chloro-o-tolyl)-S-methyl-isothiuronium hydroiodide were heated with 13.1 g. of 1,1-dimethyl-diethylenetriamine on an oil bath for approximately 0.5 hour to 155° C. while stirring. After cooling, the reaction mixture was dissolved in 2 N hydrochloric acid and the solution was purified with active charcoal. The solution was adjusted with 2 N NaOH to various pH-values, whereby each was extracted with ether to remove unreacted starting materials and by-products. The thin-layer-chromatographically uniform ether extracts were united and dried over MgSO₄ and evaporation of the ether gave 5.2 g. (37.1% yield) of 1-[2-(N,N-dimethylamino)-ethyl]-2-(4-chloro-o-toluidino)-imidazoline-(2) melting at 83–85° C.

EXAMPLE 48

Using the procedure of Example 47, N-(2,6-dichloro-phenyl)-3-methyl-isothiuronium hydroiodide and 1,1-dimethyl-diethylene triamine were reacted to obtain a 32% yield of 1-[2-(N,N-dimethylamino)-ethyl]-2-(2,6-dichlorophenylamino)-imidazoline-(2) melting at 68–70° C.

EXAMPLE 49

Using the process of Example 47, N-(2-chloro-o-tolyl)-S-methyl-isothiuronium hydroiodide and 1,1-dimethyl-diethylene triamine were reacted to obtain a 27.7% yield of 1 - [2 - (N,N-dimethylamino)-ethyl]-2-(2-chloro-o-toluidino)-imidazoline-(2) as an oil.

EXAMPLE 50

1-(2-dimethylaminoethyl)-2-(2,3-dichlorophenylamino)-2-imidazoline hydrochloride 6.5 gm. (0.05 mol) of N,N-dimethyldiethylene triamine dissolved in 50 cc. of absolute chloroform was added dropwise with stirring to a mixture of 12.1 gm. (0.05 mol) of 2,3-dichlorophenyl isocyanide dichloride and 50 cc. of anhydrous chloroform cooled to 0° C. and the reaction mixture was stirred for several hours at room temperature. The reaction mixture was then evaporated to dryness in vacuo and the residue was dissolved in dilute hydrochloric acid. The said acid solution was extracted fractionally at various pHs with ether and chloroform and the gradual neutralization was effected with dilute sodium hydroxide solution. The organic extract fractions containing the desired product were combined, dried over drierite, mixed with ethereal hydrochloric acid up to the congo acid reaction, vacuum filtered and dried to obtain 0.4 gm. (2.2% yield) of 1-(2-dimethylaminoethyl)-2-(2,3-dichlorophenylamino)-2-imidazolino-(2) hydrochloride melting at 158–162° C.

PHARMACEUTICAL EXAMPLES

Example A: Coated tablets: Mg.
2 - [N - (2,6 - dichlorophenyl)-N-(β-morpholino ethyl)-amino]-imidazoline-(2) hydrochloride _ 10
Lactose _____ 65
Corn starch _____ 125
Sec. calcium phosphate _____ 40
Soluble starch _____ 3
Magnesium stearate _____ 3
Colloidal silicic acid _____ 4

Total _____ 250

Preparation: The active ingredients were mixed with part of the excipients, kneaded intensely with an aqueous solution of the soluble starch and granulated in the usual way through a screen. The granulate was mixed with the remaining excipients and pressed into tablet cores of 250 mg. of weight. The latter were coated with sugar, talcum and gum arabic in the conventional way.

Example B: Ampoules: Mg.
2-[N - (2,6 - dichlorophenyl)-N-(β-morpholinoethyl)-amino]-imidazoline-(2) hydroiodide__ 2.0
Sodium chloride _____ 18.0
Distilled water ad 2.0 cc.

Preparation: Active ingredient and sodium chloride were dissolved in water and filled into glass ampoules under nitrogen.

Example C: Drops: G.
2 - [N - (2,6-dichloro-4-bromophenyl)-N-(β-dimethylaminoethyl) - amino] - imidazoline-(2) hydrochloride _____ 0.02
Methyl p-hydroxybenzoate _____ 0.07
Propyl p-hydroxybenzoate _____ 0.03
Demineralized water ad 100 cc.

Various modifications of the compositions and processes of the invention may be made without departing from the spirit or scope thereof and it is to be understood that the invention is to be limited only as defined in the appended claims.

We claim:
1. A compound of the formula

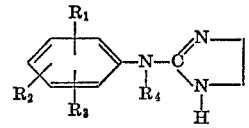

wherein
$R_1$ is hydrogen, bromine, chlorine, fluorine, methyl, ethyl, methoxy, cyano or trifluoromethyl,
$R_2$ is hydrogen, bromine, chlorine, methyl or ethyl,
$R_3$ is hydrogen, bromine or chlorine, and
$R_4$ is $-(CH_2)_n-A$,
where
$n$ is 2 or 3, and
A is di(alkyl of 1 to 4 carbon atoms)-amino, morpholino, pyrrolidino or piperidino,
or a non-toxic, pharmaceutically acceptable acid addition salt thereof.

2. A compound of claim 1, wherein
$R_1$, $R_2$ and $R_3$ are each chlorine, bromine, fluorine or methyl, and
$R_4$ is $-(CH_2)_n-A$,
where
$n$ is 2 or 3, and
A is di(alkyl of 1 to 4 carbon atoms)-amino, morpholino, pyrrolidino or piperidino,
or a non-toxic, pharmaceutically acceptable acid addition salt thereof.

3. A compound of claim 1, which is of the formula

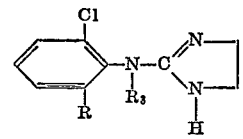

wherein
R is chlorine or methyl, and
$R_4$ is $-(CH_2)_n-A$,
wherein
$n$ is 2 or 3, and
A is di(alkyl of 1 to 4 carbon atoms)-amino, morpholino, pyrrolidino or piperidino,
or a non-toxic, pharmaceutically acceptable acid addition salt thereof.

4. A compound of claim 1 selected from the group consisting of 2 - [N - (2-chloro-p-tolyl)-N-(β-morpholinoethyl)amino]-imidazoline-(2) and its non-toxic, pharmaceutically acceptable acid addition salts.

5. A compound of claim 1 selected from the group consisting of 2 - [N - (2,6 - dichlorophenyl)-N-(β-pyrrolidinoethyl)-amino]-imidazoline-(2) and its non-toxic, pharmaceutically acceptable acid addition salts.

6. A compound of claim 1 selected from the group consisting of 2 - [N - (4 - bromo-2,6-dichlorophenyl)-N-(β-morpholinoethyl)-amino]-imidazoline-(2) and its non-toxic, pharmaceutically acceptable acid addition salts.

7. A compound of claim 1 selected from the group consisting of 2 - [N-(2,6-dichlorophenyl)-N-(β-morpholinoethyl)-amino]-imidazoline-(2) and its non-toxic, pharmaceutically acceptable acid addition salts.

8. A compound of claim 1 selected from the group consisting of 2 - [N - (2 - chloro-6-methylphenyl)-N-(β- morpholinoethyl)-amino]-imidazoline-(2) and its non-toxic, pharmaceutically acceptable acid addition salts.

9. A compound of claim 1 selected from the group consisting of 2 - [N - (2,6-dichlorophenyl)-N-(β-piperidinoethyl)-amino]-imidazoline-(2) and its non-toxic, pharmaceutically acceptable acid addition salts.

10. A compound of claim 1 selected from the group consisting of 2 - [N - (2,6-dichlorophenyl)-N-(3-dimethylaminopropyl)-amino]-imidazoline-(2) and its non-toxic, pharmaceutically acceptable acid addition salts.

References Cited
UNITED STATES PATENTS
3,595,961   7/1971   Stähle et al. _____ 260—309.6

ALEX MAZEL, Primary Examiner
J. TOVAR, Assistant Examiner

U.S. Cl. X.R.
260—293.7, 309.6; 424—248